United States Patent
Ye et al.

(10) Patent No.: US 11,210,803 B2
(45) Date of Patent: Dec. 28, 2021

(54) METHOD FOR 3D SCENE DENSE RECONSTRUCTION BASED ON MONOCULAR VISUAL SLAM

(71) Applicant: DALIAN UNIVERSITY OF TECHNOLOGY, Liaoning (CN)

(72) Inventors: Xinchen Ye, Liaoning (CN); Wei Zhong, Liaoning (CN); Zhihui Wang, Liaoning (CN); Haojie Li, Liaoning (CN); Lin Lin, Liaoning (CN); Xin Fan, Liaoning (CN); Zhongxuan Luo, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 45 days.

(21) Appl. No.: 16/650,331

(22) PCT Filed: Jan. 7, 2019

(86) PCT No.: PCT/CN2019/070589
§ 371 (c)(1),
(2) Date: Mar. 24, 2020

(87) PCT Pub. No.: WO2019/174377
PCT Pub. Date: Sep. 19, 2019

(65) Prior Publication Data
US 2020/0273190 A1 Aug. 27, 2020

(30) Foreign Application Priority Data
Mar. 14, 2018 (CN) .......................... 201810207145.7

(51) Int. Cl.
*G06T 7/00* (2017.01)
*G06T 7/579* (2017.01)
(Continued)

(52) U.S. Cl.
CPC .............. *G06T 7/579* (2017.01); *G06T 7/246* (2017.01); *G06T 7/70* (2017.01); *G06T 17/00* (2013.01);
(Continued)

(58) Field of Classification Search
None
See application file for complete search history.

(56) References Cited

U.S. PATENT DOCUMENTS

| 9,940,553 | * | 4/2018 | Shotton | ................ G06K 9/6219 |
| 10,431,000 | * | 10/2019 | Zhang | ....................... G06T 7/55 |

(Continued)

FOREIGN PATENT DOCUMENTS

| CN | 106157307 A | 11/2016 |
| CN | 106856012 A | 6/2017 |

(Continued)

OTHER PUBLICATIONS

Dense Mapping from Feature-Based Monocular SLAM Based on Depth Prediction. Duan et al. (Year: 2018).*

*Primary Examiner* — Delomia L Gilliard
(74) *Attorney, Agent, or Firm* — Muncy, Geissler, Olds & Lowe, P.C.

(57) ABSTRACT

The present invention provides a method of dense 3D scene reconstruction based on monocular camera and belongs to the technical field of image processing and computer vision, which builds the reconstruction strategy with fusion of traditional geometry-based depth computation and convolutional neural network (CNN) based depth prediction, and formulates depth reconstruction model solved by efficient algorithm to obtain high-quality dense depth map. The system is easy to construct because of its low requirement for hardware resources and achieves dense reconstruction only depending on ubiquitous monocular cameras. Camera (Continued)

tracking of feature-based SLAM provides accurate pose estimation, while depth reconstruction model with fusion of sparse depth points and CNN-inferred depth achieves dense depth estimation and 3D scene reconstruction; The use of fast solver in depth reconstruction avoids solving inversion of large-scale sparse matrix, which improves running speed of the algorithm and ensures the real-time dense 3D scene reconstruction based on monocular camera.

2 Claims, 3 Drawing Sheets

(51) Int. Cl.
  *G06T 7/246* (2017.01)
  *G06T 7/70* (2017.01)
  *G06T 17/00* (2006.01)
(52) U.S. Cl.
  CPC ............... *G06T 2207/10016* (2013.01); *G06T 2207/10024* (2013.01); *G06T 2207/20084* (2013.01); *G06T 2207/20221* (2013.01); *G06T 2207/30244* (2013.01)

(56) References Cited

U.S. PATENT DOCUMENTS

| 10,621,783 | * | 4/2020 | Park ........................... G06T 7/70 |
| 2013/0129190 | * | 5/2013 | Cohen ....................... G06K 9/00 |
| | | | 382/154 |
| 2018/0027224 | * | 1/2018 | Javidnia ............... H04N 13/128 |
| | | | 382/154 |
| 2019/0122378 | * | 4/2019 | Aswin ..................... G06T 5/003 |
| 2019/0158813 | * | 5/2019 | Rowell ................. H04N 13/189 |
| 2019/0226852 | * | 7/2019 | Xie ........................ G01C 21/165 |
| 2020/0219272 | * | 7/2020 | Pizer ....................... G06T 7/579 |

FOREIGN PATENT DOCUMENTS

| CN | 106875482 A | 6/2017 | |
| CN | 107194985 A | 9/2017 | |
| CN | 108416840 A | 8/2018 | |
| WO | WO-2018129715 A1 * | 7/2018 | ............. G06T 17/00 |

\* cited by examiner

METHOD FOR 3D SCENE DENSE RECONSTRUCTION BASED ON MONOCULAR VISUAL SLAM

TECHNICAL FIELD

The present invention belongs to the technical field of image processing and computer vision, and relates to a method that uses feature-based simultaneous localization and mapping (SLAM) for camera pose estimation and 3D scene reconstruction and builds the reconstruction strategy with fusion of traditional geometry-based depth computation and convolutional neural network (CNN) based depth prediction. Specifically, it relates to a method for 3D scene dense reconstruction based on monocular camera.

BACKGROUND

Structure from motion (SfM) and simultaneous localization and mapping (SLAM) are hot topics in the field of computer vision and robotics, which focus on camera pose estimation and environment reconstruction simultaneously in an unknown environment. With the wide application of visual SLAM technology in unmanned driving, mobile robots and virtual reality, people have higher and higher requirements for SLAM technology, especially in precise positioning and dense map reconstruction. SLAM method based on depth camera or binocular camera can achieve dense reconstruction of 3D scene. However, the main drawback of these approaches is that they are extremely dependent on the capturing equipment, leading to the limitations in real environments. Especially, RGB-D camera is only applied under the indoor environment due to its confined working range and sensitivity to light variation. Therefore, SLAM based on monocular camera is more ubiquitous. Usually, existing monocular techniques are divided into two groups: feature-based and direct tracking methods. Feature based monocular SLAM relies on extracting feature points from different viewpoints and matching these feature points. Then, based on these matched pair of feature points, the pose and 3D scene structure of the camera are obtained by using the multi-view geometry principle. Although the tracking performance of such algorithm is impressive, the 3D map generated by the algorithm is extremely sparse. On the other hand, the monocular direct method does not depend on the extraction and matching of feature points, but directly solves camera motion by comparing the color of pixels, so it usually has better robustness in the case of missing feature and blurring image. However, the generated map is semi-dense and cannot be used in robotic navigation and other applications.

Existing methods of dense reconstruction based on monocular camera are classified into two categories:(1) Utilizing low-level hand-crafted priors to guide depth reconstruction, e.g., Manhattan world assumptions, piecewise planar priors and smoothness assumptions. This kind of SLAM method based on pure geometry pays too much attention to the low-level features of the scene and neglects the understanding of the content of the high-level scene. (2) Using convolution neural network (CNN) to assist depth inference to realize dense reconstruction of 3D scene. The use of CNN in an end to end fashion has demonstrated the ability of regressing depth map or surface normal at a relatively high accuracy. However, a major limitation of CNN-inferred depth map is that, although globally accurate, depth boundaries tend to be blurred. If such depth map without pre-processing are used for scene reconstruction, the results will suffer from the deficiency of shape details. Therefore, C. Weerasekera et al. proposes to generate a fully dense reconstruction of a scene by formulating depth estimation as an energy minimization, in which the data term computes photometric error while regularization term encodes surface normal predicted by CNN(C. Weerasekera, Y. Latif, R. Garg, and I. Reid. Dense monocular reconstruction using surface normal. IEEE ICRA, 2017, 2524-2531). The use of learned surface normal improves the accuracy, but the minimization based on photometric error in direct tracking method makes the whole algorithm too sensitive to light variation and dynamic interference, which has a lower localization accuracy compared with feature-based SLAM method.

SUMMARY

To solve the above-mentioned problems, the present invention provides a 3D scene dense reconstruction method based on monocular camera, i.e. constructing a depth fusion framework based on the combination of CNN-inferred depth map and sparse map-points generated by feature-based SLAM, and formulating a depth reconstruction model solved by an efficient algorithm to obtain high-quality dense depth maps.

The technical solution of the present invention:

A method for 3D scene dense reconstruction based on monocular visual SLAM, comprising the following steps:

(1) Camera pose estimation and key frames selection: To keep the performance of tracking efficiency, the key frames with their corresponding pose, including translation and orientation, are selected from real-time video stream.

(2) Depth estimation from CNN based on monocular color image: the key frames generated by previous step are input into the well-trained CNN model to obtain corresponding depth maps.

(3) Scale consensus: Sparse depth maps and low resolution depth maps predicted by CNN are generated in the phase of camera pose estimation. Before depth fusion, the scale factors between sparse depth maps and low resolution CNN depth maps should be normalized to the same scale.

(4) Depth fusion and reconstruction: Depth sources are fused and the corresponding confidence map is computed for every key frame. The energy function is formulated in conjunction with data term and regularization term. A fast solver is proposed to speed up the algorithm. Dense depth maps are regressed and the dense 3D scene is thus reconstructed.

Camera pose estimation and key frames selection, comprising the following steps:

(1-1) Map initialization

Features of two continuous video frames are extracted and the correspondences are constructed between them. Then, based on epipolar or homography constraint (where the feature points are on the same plane), an essential matrix E or a homography matrix H is solved by normalized 8-point method or 4-point method. Last, the relative transformation between two frames, i.e. rotation and translation, could be recovered from essential matrix or homography matrix by using singular value decomposition (SVD). After obtaining the relative motion between frames and matching points, the depth of feature points is recovered from triangulation, and the initial 3D map points are constructed.

(1-2) Matching feature points in subsequent video frames with initial 3D map-points from step (1-1) by constructing energy function to iteratively optimize the reprojection error.

(1-3) Key frames are selected according to time interval, pose variation and numbers of matched map-points in tracking process.

Scale consensus comprising the following steps:

(3-1) Obtaining sparse depth map D' generated from step (1), whose pixels with non-zero values are correspondent to 3D map-points in tracking process, while the remaining pixels are zero values.

(3-2) The low resolution depth map $\tilde{D}$ predicted by CNN in step (2) is interpolated by bilinear interpolation to obtain the same size depth map of the original video frame. Then, according to the non-zero position of the pixels in D', the corresponding pixels are found in the depth map $\tilde{D}$ after interpolation, and thus a set of point pairs are constructed.

(3-3) Solving the scale factor between pairs of depth samples from the constructed set of pixel pairs of step (3-2).

Depth fusion and reconstruction, comprising the following steps:

(4-1) Depth fusion: Sparse depth map D' generated from camera tracking process and CNN-inferred low-resolution depth map $\tilde{D}$ are normalized into the same scale, then the fused depth map $\overline{D}_p$ at a given pixel index p is defined as:

$$\overline{D}_p = \begin{cases} D'_p, & D'_p \neq 0 \\ \tilde{D}_p, & D'_p = 0, \tilde{D}_p \neq 0 \\ 0, & D'_p = 0, \tilde{D}_p = 0 \end{cases}$$

Here, $D'_p$, $\tilde{D}_p$, $\overline{D}_p$ denote the value of pixel p in depth map D', $\tilde{D}$, $\overline{D}$, respectively.

(4-2) According to different depth sources and the distance to depth boundaries, computing the confidence map H for fused depth map of step (4-1), H represents the depth accuracy of different pixels and is used in the following dense depth reconstruction. In the confidence map, for those pixels $p \in \{p | \overline{D}_p = 0\}$, we set the $H_p = 0$, while we set $H_p = 1$ for pixels $p \in \{p | D'_p \neq 0\}$. The confidence values of remaining pixels in H, i.e. those corresponding to CNN-inferred depth samples, are computed as below:

$$H_p = \min\left(\left(\frac{d_p}{d_{max}}\right)^2, 1\right), p \in \{p | D'_p = 0, \tilde{D}_p \neq 0\}$$

Where $H_p$ is confidence value at pixel p, $d_p$ is the distance between current pixel p and its nearest pixel in the set Q. Q is a set of pixels at the edge of a color image obtained by edge detection operator, $d_{max}$ is a maximum threshold.

(4-3) Using the fused sparse depth map of step (4-1) and the confidence map H of (4-2) to formulate data term of the depth reconstruction model, while its regularization term encodes depth smoothness between current pixel with its neighbors guided by color image, then combining the two terms to construct final energy function, and solving the function by a fast solver.

The Detailed Steps are as Follows:

(4-3-1) Formulating data term of the depth reconstruction model: Using the fused depth map in step (4-1) and confidence map in step (4-2) to formulate the data term $E_{data}(\cdot)$, the data term $E_{data}(\cdot)$ is formulated as:

$$E_{data}(D) = \sum_p H_p(D_p - \overline{D}_p)^2$$

D is the depth map to be solved, while $D_p$, $\overline{D}_p$ denote value of depth map to be solved and fused depth map at pixel p. $H_p$ is confidence value at pixel p.

(4-3-2) Formulating regularization term of the depth reconstruction model, using color image as a guide; regularization term $E_{smooth}(\cdot)$ is defined as:

$$E_{smooth}(D) = \sum_p \sum_{q \in N_4(p)} w_{p,q}(D_p - D_q)^2$$

D is the dense depth map to be solved, while $D_p$, $D_q$ denote value of D at pixel p and q. $\mathcal{N}_4(p)$ is 4-connected neighborhood of pixel p and the weight $w_{p,q}$ denotes the smoothness constraint coefficient for the pixel p and q, which is defined according to the similarity between the pixels based on the color image C:

$$w_{p,q} = \exp(-(C_p - C_q)^2/\sigma^2)$$

Where $C_p$, $C_q$ is value of color image at pixel p and q and exp($\cdot$) represents exponential operation. Parameter $\sigma$ is the standard deviation for adjusting and controlling the variation of the filter, and its value range is 0.1-0.5, with the median value being the best.

(4-3-3) Introducing the balance parameter $\lambda$, the final energy function is constructed in conjunction with data term $E_{data}(\cdot)$ in (4-3-1) and smoothness term $E_{smooth}(\cdot)$ in (4-3-2):

$$\min_D E_{data}(D) + \lambda E_{smooth}(D)$$

min represents operation of solving minimal energy of function. The value of balance parameter $\lambda$ is 30. The optimization function can be written in the following matrix form, and is solved by weighted least squares:

$$(\tilde{H} + \lambda W)d = H\overline{d}$$

Where d, $\overline{d}$ are the vector form of D and $\overline{D}$ respectively. $\tilde{H}$ is a diagonal matrix with its diagonal elements given by the confidence map H. W denotes the spatially varying Laplacian matrix defined by the coefficient $w_{p,q}$.

The present invention has the following beneficial effects:

The present invention proposes a depth fusion and reconstruction strategy based on the combination of traditional geometry-based depth computation from SLAM and depth prediction from convolutional neural network (CNN). On this basis, the depth reconstruction model is established and the accelerated algorithm is applied to solve the model. It has the following characteristics:

1. The system is easy to construct because of its low requirement for hardware resource and achieves 3D scene dense reconstruction only depending on ubiquitous monocular cameras.

2. The method of feature-based SLAM ensures the accuracy of positioning, while low-resolution depth map with fusion of sparse depth points and CNN-inferred depth achieves dense depth estimation and 3D scene dense reconstruction.

3. The use of fast solver in depth reconstruction avoids solving inversion of large-scale sparse matrix, which improves running speed of the algorithm and ensures the real-time dense 3D scene reconstruction based on monocular camera.

The present invention makes full use of depth points generated by traditional geometry based SLAM and CNN-inferred depth to construct efficient depth fusion and reconstruction model guided by color images, which achieves dense 3D scene reconstruction based monocular camera. The proposed method has a good extendibility and could achieve accurate dense reconstruction when combining with other different camera tracking algorithm.

DESCRIPTION OF DRAWINGS

In FIG. 2, 'conv' and 'pool' denote convolutional and pooling operation respectively, 'Residual Blocks' represents several residual blocks, 'D-convKernel' represents dilated convolutional operation, 'dilated factor' denotes expansion factor, respectively.

FIG. 3 shows: (a) Ground truth of gray and depth maps; (b) the depth maps predicted by CNN; (c) the reconstructed depth maps after fusion; (d) the 3D reconstruction results corresponding to the real depth maps; (e) the 3D reconstruction results corresponding to the depth maps predicted by CNN; (f) the 3D reconstruction results corresponding to the reconstructed depth maps after fusion.

DETAILED DESCRIPTION

Figure 1:
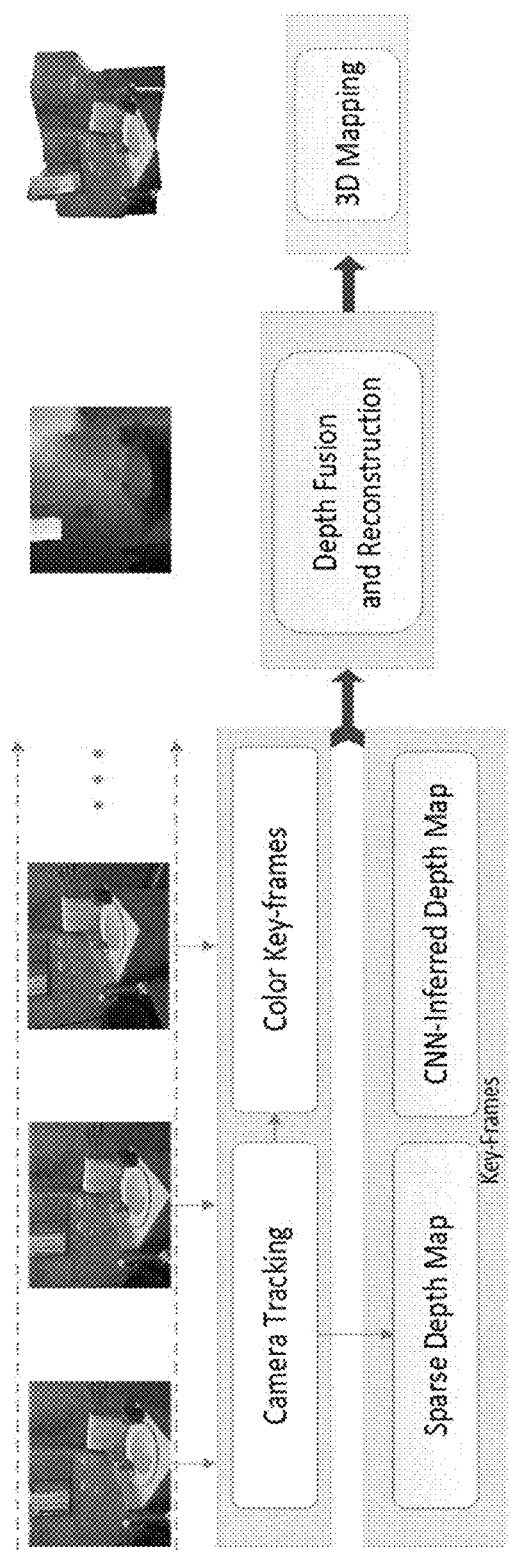
FIG. 1 is a structural schematic diagram of the system.

Specific embodiment of the present invention is further described below in combination with accompanying drawings and the technical solution:

The present invention takes the video stream (30 fps) from monocular camera as experiment data and the resolution of camera is 480×640.The invention provides a dense reconstruction method based on monocular camera, i.e. constructing a depth fusion framework based on the combination of CNN-inferred depth and sparse map-points generated by feature-based SLAM, and formulating a depth reconstruction model solved by efficient algorithm to obtain high-quality dense depth map. FIG. 1 shows the pipeline of the proposed system and the detailed steps are shown as follows:

(1) Camera pose estimation and key frames selection: To keep the performance of tracking efficiency, the key frames $k_i$ with their corresponding pose $P_{k_i}=[R_{k_i}, t_{k_i}]$ (position and orientation), including 3Dtranslationvector$t_{k_i}$ and a 3×3 rotation matrix $R_{k_i}$, are selected from real-time video stream.

(1-1) Map initialization

Features of two continuous video frames are extracted and the correspondences are constructed between them. Then, based on epipolar or homography constraint(where the feature points are on the same plane), an essential matrix E or a homography matrix H is solved by normalized 8-point method or 4-point method. Last, the relative transformation between two frames, i.e. rotation and translation, could be recovered from essential matrix or homography matrix by using singular value decomposition (SVD). After obtaining the relative motion between frames and matching points, the depth of feature points is recovered from triangulation, and the initial 3D map points are constructed.

(1-2) Matching feature points in subsequent video frames with initial3D map-points from initialization in step (1-1) by constructing energy function to iteratively optimize the reprojection error as follows:

$$\{R, t\} = \underset{R,t}{\operatorname{argmin}} \sum_{j \in \chi} \rho(|x_j - \pi(RX_j + t)|_\Sigma^2)$$

where $\chi$ represents a set of 3D mappoints and 2D feature point of matching pairs, and j is the index of matched pairs. R and t denote the pose of the current frame, i.e., rotation and translation, respectively, while ρ is the robust Huber loss function.Σ is covariance matrix, $|.|_\Sigma^2$ is Mahalanobis distance, and π is perspective projection function. We can use optimization tools such as Ceres or g2o, etc. to solve the problem. Here we choose g2o, which is a model solver based on graph optimization.

(1-3) Key frames are selected according to time interval, pose variation and numbers of matched map-points in tracking process.

Figure 2:
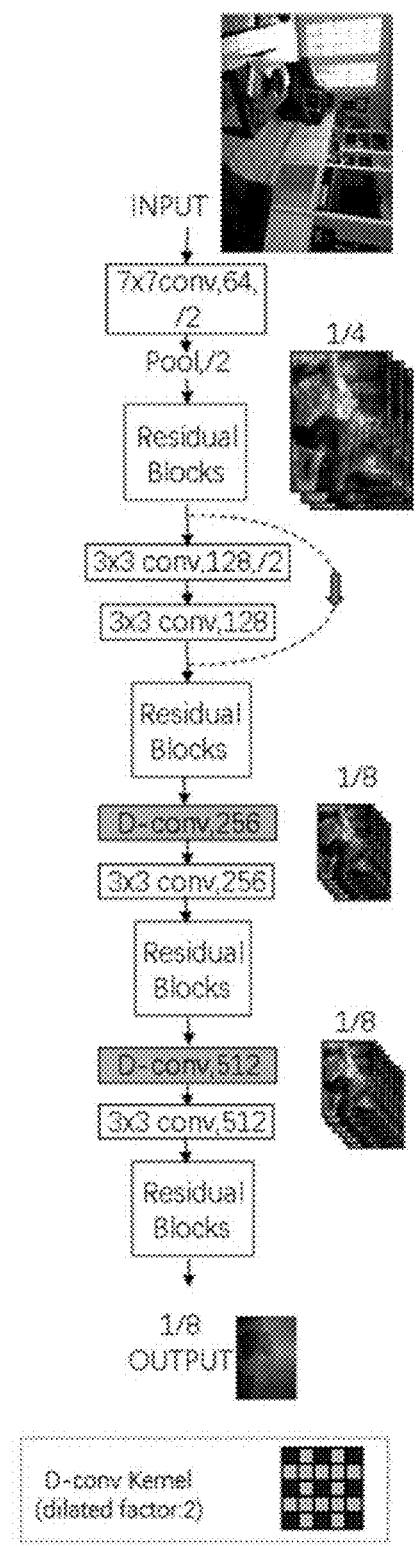
FIG. 2 is a structural diagram of CNN architecture.

(2) CNN depth estimation based on monocular color image: As shown in FIG. 2, the CNN network model has made the following changes based on ResNet-101 model: All the fully connected layers are replaced by convolutional layers. the L2 norm is used as loss function. Dilated convolutions are used to replace the stride operators (/2) at the last two down sampling layers. The architecture of the whole network is shown in FIG. 2.

(2-1) The training of the model

The whole CNN network is trained on NYU-D v2 dataset, in which 1449 color and depth image pairs are selected from 464 scenes. 795 and 654 images pairs are used for training and testing separately. The momentum parameter is set to 0.9. The learning rate is initialized to 1e-4 for all layers and decreased by 0.9 for every epoch.

(2-2) Using the model trained in (2-1) to predict the depth of the key frames generated in (1)

(3) Scale consensus: The difference between 3D map points generated from (1) and the depth inferred by CNN is one scale factor. Therefore, before deep fusion the scale is normalized.

(3-1) Obtaining sparse depth map D' generated from step (1), whose pixels with non-zero values are correspondent to 3D map-points in tracking process, while the remaining pixels are zero values.

(3-2) The low resolution depth map $\hat{D}$ predicted by CNN in step (2) is interpolated by bilinear interpolation to obtain the same size depth map of the original video frame. Then, according to the non-zero position of the pixels in D', the corresponding pixels are found in the depth map $\hat{D}$ after interpolation, and thus a set of point pairs are constructed.

(3-3) The scale factor between two kinds of depth information is solved by using the pixel pairs in (3-2). The simplest method is to calculate the average value of the depth of two groups of points separately, and then calculate a proportion as a scale factor, but the accuracy of this method is not enough. On the other hand, considering that the problem is a simple linear model with enough sampling pairs, we can try to use least squares fitting to solve an optimal solution. The results of least squares fitting can well represent the distribution of the whole data, but are sensitive to outliers. Therefore, the least squares fitting based on random sample consensus (RANSAC) is adopted to eliminate the influence of outliers and improve the accuracy of solution. In the iteration process, the threshold is set to 0.18. When a certain point is transformed by scale factor, the error with the corresponding point is less than the threshold, which is determined as the interior point.

(4) Depth fusion and reconstruction: Depth sources are fused and the corresponding confidence map is computed for every key frame. The energy function is formulated in conjunction with data term and regularization term. A fast solver is proposed to speed up the algorithm. Dense depth maps are regressed and the dense 3D scene is thus reconstructed.

(4-1) Depth fusion: Sparse depth map D' generated from camera tracking process and CNN-inferred low-resolution depth map $\tilde{D}$ are normalized into the same scale, then the fused depth map $\overline{D}_p$ at a given pixel index p is defined as:

$$D_p = \begin{cases} D'_p, & D'_p \neq 0 \\ \tilde{D}_p, & D'_p = 0, \tilde{D}_p \neq 0 \\ 0, & D'_p = 0, \tilde{D}_p = 0 \end{cases}$$

Here, $D'_p$, $\tilde{D}_p$, $\overline{D}_p$ denote the value of pixel p in depth map D', $\tilde{D}$, $\overline{D}$, respectively.

(4-2) According to different depth sources and the distance to depth boundaries, computing the confidence map H for fused depth map of step (4-1), H represents the depth accuracy of different pixels and is used in the following dense depth reconstruction. In the confidence map, for those pixels $p \in \{p | \overline{D}_p = 0\}$, we set the $H_p = 0$, while we set $H_p = 1$ for pixels $p \in \{p | D'_p \neq 0\}$. The confidence values of remaining pixels in H, i.e. those corresponding to CNN-inferred depth samples, are computed as below:

$$H_p = \min\left(\left(\frac{d_p}{d_{max}}\right)^2, 1\right), p \in \{p | D'_p = 0, \tilde{D}_p \neq 0\}$$

Where $H_p$ is confidence value at pixel p, $d_p$ is the distance between current pixel p and its nearest pixel in the set Q. Q is a set of pixels at the edge of a color image obtained by edge detection operator $d_{max}$ is a maximum threshold with the value of 30 pixels. The depth inferred by CNN has a lower confidence when it approaches pixels in Q.

(4-3) Using the fused sparse depth map of step (4-1) and the confidence map H of (4-2) to formulate data term of the depth reconstruction model, while its regularization term encodes depth smoothness between current pixel with its neighbors guided by color image, then combining the two terms to construct final energy function, and solving the function by a fast solver.

The detailed steps are as follows:

(4-3-1) Formulating data term of the depth reconstruction model: Using the fused depth map in step (4-1) and confidence map in step (4-2) to formulate the data term $E_{data}(\cdot)$, the data term $E_{data}(\cdot)$ is formulated as:

$$E_{data}(D) = \sum_p H_p (D_p - \overline{D}_p)^2$$

D is the depth map to be solved, while $D_p$, $\overline{D}_p$ denote value of depth map to be solved and fused depth map at pixel p. $H_p$ is confidence value at pixel p.

(4-3-2) Formulating regularization term of the depth reconstruction model, using color image as a guide; regularization term $E_{smooth}(\cdot)$ is defined as:

$$E_{smooth}(D) = \sum_p \sum_{q \in N_4(p)} w_{p,q} (D_p - D_q)^2$$

D is the dense depth map to be solved, while $D_p$, $D_q$ denote value of D at pixel p and q. $\mathcal{N}_4(p)$ is 4-connected neighborhood of pixel p and the weight $w_{p,q}$ denotes the smoothness constraint coefficient for the pixel p and q, which is defined according to the similarity between the pixels based on the color image C:

$$w_{p,q} = \exp(-(C_p - C_q)^2/\sigma^2)$$

Where $C_p$, $C_q$ is value of color image at pixel p and q and $\exp(\cdot)$ represents exponential operation. Parameter $\sigma$ is the standard deviation for adjusting and controlling the variation of the filter, and its value range is 0.1-0.5, with the median value being the best.

(4-3-3) Introducing the balance parameter $\lambda$, the final energy function is constructed in conjunction with data term $E_{data}(\cdot)$ in (4-3-1) and smoothness term $E_{smooth}(\cdot)$ in (4-3-2):

$$\min_D E_{data}(D) + \lambda E_{smooth}(D)$$

min represents operation of solving minimal energy of function. The value of balance parameter $\lambda$ is 30. The optimization function can be written in the following matrix form, and is solved by weighted least squares:

$$(\tilde{H} + \lambda W)d = H\overline{d}$$

Where d, $\overline{d}$ are the vector form of D and $\overline{D}$ respectively. $\tilde{H}$ is a diagonal matrix with its diagonal elements given by the confidence map H. W denotes the spatially varying Laplacian matrix defined by the coefficient $w_{p,q}$.

Note that the matrix $\tilde{H} + \lambda W$ is highly ill-conditioned, directly reversing it to compute the solution is unstable and time-consuming. The present invention exploits effective fast solver (D. Min, S. Choi, J. Lu, B. Ham, K. Sohn, and M. Do: "Fast global image smoothing based on weighted least squares." IEEE TIP, 23(12), 2014, 5638-5653) to achieve a reasonable running time while having good numerical stability.

Figure 3:
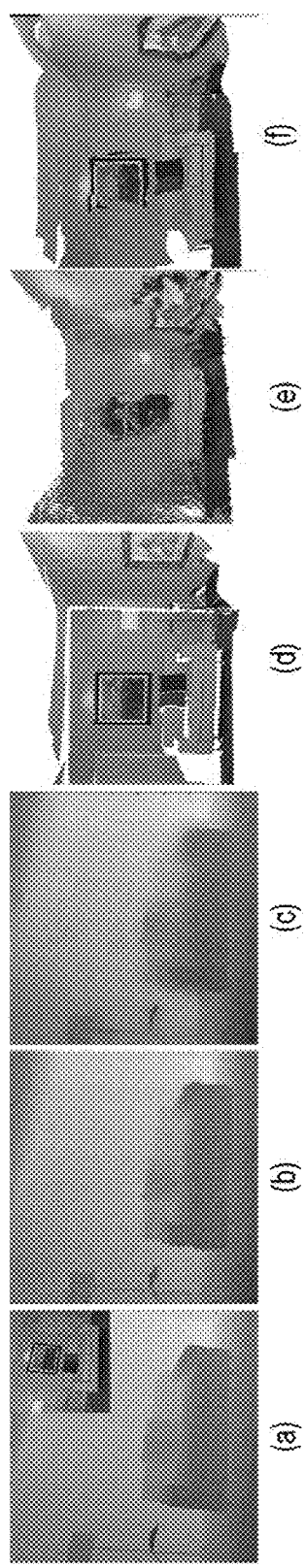
FIG. 3 is a result of depth map fusion and 3D reconstruction.

The final recovery results of a set of data in this implementation are shown in FIG. 3, in which (a) is the real result of grey and depth images selected from a set of data, (b) is the depth map predicted by CNN in the present invention, (c) is the depth map after fusion reconstruction of the present invention, (d), (e), (f) are the true depth map, the depth map predicted by CNN and the fusion reconstruction respectively. The results of 3D reconstruction corresponding to depth map are displayed.

The invention claimed is:

1. A method for 3D scene dense reconstruction based on monocular visual simultaneous localization and mapping (SLAM), wherein, the method comprises the following steps:
   (1) camera pose estimation and key frames selection: the key frames with their corresponding pose, including translation and orientation, are selected from real-time video stream;
   (2) depth estimation from Convolutional Neural Network (CNN) based on monocular color image: the key frames generated by previous step are input into the well-trained CNN model to obtain corresponding depth maps;
   (3) scale consensus: sparse depth maps and low resolution depth maps predicted by CNN are generated in the phase of camera pose estimation; before depth fusion, the scale factors between sparse depth maps and low resolution CNN depth maps are normalized to the same scale;
   (4) depth fusion and reconstruction: depth maps are fused and a corresponding confidence map is computed for every key frame; the energy function is formulated in conjunction with data term and regularization term; a fast solver is proposed to speed up the algorithm; dense depth maps are regressed and the dense 3D scene is thus reconstructed;

wherein the depth fusion and reconstruction of step (4) comprises the following steps:

(4-1) depth fusion: sparse depth map D' generated from camera tracking process and CNN-inferred low-resolution depth map $\tilde{D}$ are normalized into the same scale, then the fused depth map $\overline{D}_p$ at a given pixel index p is defined as:

$$D_p = \begin{cases} D'_p, & D'_p \neq 0 \\ \tilde{D}_p, & D'_p = 0, \tilde{D}_p \neq 0 \\ 0, & D'_p = 0, \tilde{D}_p = 0 \end{cases}$$

where, $D'_p$, $\tilde{D}_p$, $\overline{D}_p$ denote the value of pixel p in depth map D', $\tilde{D}$, $\overline{D}$, respectively;

(4-2) according to different depth maps and the distance to depth boundaries, computing the confidence map H for fused depth map of step (4-1), H represents the depth accuracy of different pixels and is used in the following dense depth reconstruction; in the confidence map, for those pixels p∈{p|$\overline{D}_p$=0}$H_p$=0, for pixels p∈ {p|D'$_p$≠0}; the confidence values of remaining pixels in H, i.e. those corresponding to CNN-inferred depth samples, are computed as below:

$$H_p = \min\left(\left(\frac{d_p}{d_{\max}}\right)^2, 1\right), p \in \{p \mid D'_p = 0, \tilde{D}_p \neq 0\}$$

where is confidence value at pixel p, $d_p$ is the distance between current pixel p and its nearest pixel in the set Q;Q is a set of pixels at the edge of a color image obtained by edge detection operator, $d_{max}$ is a maximum threshold;

(4-3) using the fused sparse depth map of step (4-1) and the confidence map H of (4-2) to formulate data term of the depth reconstruction model, while its regularization term encodes depth smoothness between current pixel with its neighbors guided by color image, then combining the two terms to construct final energy function, and solving the function by a fast solver.

2. The method for 3D scene dense reconstruction based on monocular visual SLAM according to claim 1, wherein, the step (4-3) comprises the following steps:

(4-3-1) formulating data term of the depth reconstruction model: using the fused depth map in step (4-1) and confidence map in step (4-2) to formulate the data term $E_{data}(\cdot)$, the data term $E_{data}(\cdot)$ is formulated as:

$$E_{data}(D) = \sum_p H_p(D_p - \overline{D}_p)^2$$

D is the depth map to be solved, while $D_p$, $\overline{D}_p$ denote value of depth map to be solved and fused depth map at pixel p, $H_p$ is confidence value at pixel p;

(4-3-2) formulating regularization term of the depth reconstruction model, using color image as a guide; regularization term $E_{smooth}(\cdot)$ is defined as:

$$E_{smooth}(D) = \sum_p \sum_{q \in N_4(p)} w_{p,q}(D_p - D_q)^2$$

where D is the dense depth map to be solved, while $D_p$, $D_q$ denote value of D at pixel p and $\mathcal{N}_4(p)$ is 4-connected neighborhood of pixel p and the weight $w_{p,q}$ denotes the smoothness constraint coefficient for the pixel p and q, which is defined according to the similarity between the pixels based on the color image C:

$$w_{p,q} = \exp(-(C_p - C_q)^2/\sigma^2)$$

where $C_p$, $C_q$ is value of color image at pixel p and q and exp(·)represents exponential operation; parameter σ is the standard deviation for adjusting and controlling the variation of the filter, and its value range is 0.1-0.5;

(4-3-3) introducing the balance parameter λ, the final energy function is constructed in conjunction with data term $E_{data}(\cdot)$ in (4-3-1) and smoothness term n (4-3-2):

$$\min_D E_{data}(D) + \lambda E_{smooth}(D)$$

wherein min represents operation of solving minimal energy of function, the value of balance parameter λ is 30;the optimization function can be written in the following matrix form, and is solved by weighted least squares:

$$(\tilde{H} + \lambda W)d = H\overline{d}$$

d, $\overline{d}$ are the vector form of D and $\overline{D}$ respectively $\tilde{H}$ is a diagonal matrix with its diagonal elements given by the confidence map H;W denotes the spatially varying Laplacian matrix defined by the coefficient $w_{p,q}$.

* * * * *